United States Patent
Okuchi et al.

(10) Patent No.: US 6,201,350 B1
(45) Date of Patent: Mar. 13, 2001

(54) DISCHARGE LAMP LIGHTNING APPARATUS AND MANUFACTURING METHOD THEREFOR

(75) Inventors: Hiroaki Okuchi, Anjo; Hiromi Hiramatsu, Kariya; Yasutoshi Horii, Nagoya; Noboru Yamamoto, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/431,081

(22) Filed: Nov. 1, 1999

(30) Foreign Application Priority Data

Nov. 20, 1998 (JP) .................................................. 10-331293
Dec. 24, 1998 (JP) .................................................. 10-367412

(51) Int. Cl.[7] .................................................. B60Q 1/02
(52) U.S. Cl. ............................. 315/82; 315/57; 315/282; 361/743; 361/836; 361/722
(58) Field of Search ................................... 315/289, 290, 315/239, 240, 82, DIG. 5, 291, 57, 70, 85, 276, 282; 361/717–719, 722, 743, 836; 439/642

(56) References Cited

U.S. PATENT DOCUMENTS

| | | | |
|---|---|---|---|
| 3,872,350 | * | 3/1975 | Powell et al. ................... 315/104 |
| 5,517,171 | * | 5/1996 | Kotani et al. .................... 338/118 |
| 5,929,745 | * | 7/1999 | Tsunezawa et al. ............. 338/160 |
| 5,959,407 | * | 9/1999 | Ito et al. ............................ 315/82 |
| 6,057,650 | * | 5/2000 | Betz et al. ........................ 315/289 |
| 6,066,921 | * | 5/2000 | Nakamura et al. ................ 315/71 |

* cited by examiner

Primary Examiner—Haissa Philogene
(74) Attorney, Agent, or Firm—Nixon & Vanderhye, P.C.

(57) ABSTRACT

In a discharge lamp lighting apparatus for a discharge lamp, each circuit component including a starter transformer is assembled to a bus bar casing, and a high voltage terminal of the starter transformer is connected to one end of a connecting terminal. The bus bar casing is adhesive-cemented to a metal base to which a HIC is attached. Then, a sealing resin fills the bus bar casing to seal the starter transformer and the HIC with the sealing resin. After the sealing resin solidifies, the other end of the connecting terminal and an output cable are connected, and subsequently a resin cover is assembled to the metal base. A shielding sheath covering the output cable is fixed to the bus bar casing by a clip. A ground connection part of the bus bar connectable to the ground side of an electric power source is shaped to protrude from the bus bar casing. The cover, the clip, the ground connection part and the base are ground-connected by a thread.

27 Claims, 8 Drawing Sheets

DISCHARGE LAMP LIGHTNING APPARATUS AND MANUFACTURING METHOD THEREFOR

CROSS REFERENCE TO RELATED APPLICATION

The present application relates to and incorporates herein by reference Japanese Patent Applications No. 10-331293 filed on Nov. 20, 1998 and No. 10-367412 filed on Dec. 24, 1998.

BACKGROUND OF THE INVENTION

1. Field of the Invention

The present invention relates to a discharge lamp lighting apparatus for driving a high voltage discharge lamp which may be used, for instance, as a front light of a vehicle, and a manufacturing method for the discharge lamp lighting apparatus.

2. Related Art

In a lighting apparatus (ballast) for a discharge lamp, a starter transformer is used to generate a high voltage at the time of starting to light the lamp. The high voltage causes a capacitive discharge between the electrodes of the lamp to generate an arc before the normal lighting operation.

In the above ballast, the starter transformer is accommodated within a transformer casing after its winding is connected to an output cable. The starter transformer is molded with an epoxy resin or the like for electrical insulation. The output cable is embedded in the starter transformer, requiring extra work in the ballast manufacturing process. Further, it is difficult to automate the ballast manufacturing process.

SUMMARY OF THE INVENTION

The present invention has an object to provide an improved discharge lamp lighting apparatus and an improved manufacturing method therefor.

According to a first aspect of the present invention, a connecting terminal is provided with its one end being connected to a high voltage terminal of a starter transformer and its other end being connected to an output cable. A connection part between the high voltage terminal of the starter transformer and the one end of the terminal is sealed in an electrically insulated manner with an insulating resin, thus eliminating embedding the output cable within the starter transformer.

According to a second aspect of the present invention, a ground connection part of a bus bar which is connectable to a ground side of an electric power source, a shielding member and a base member are constructed to be grounded at one location under a condition that a circuit unit is accommodated within the base member.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described hereinafter with reference to its embodiments shown in the drawings using the same or similar reference numerals to designate the same or similar parts throughout the embodiments.

(First Embodiment)

Figure 1:
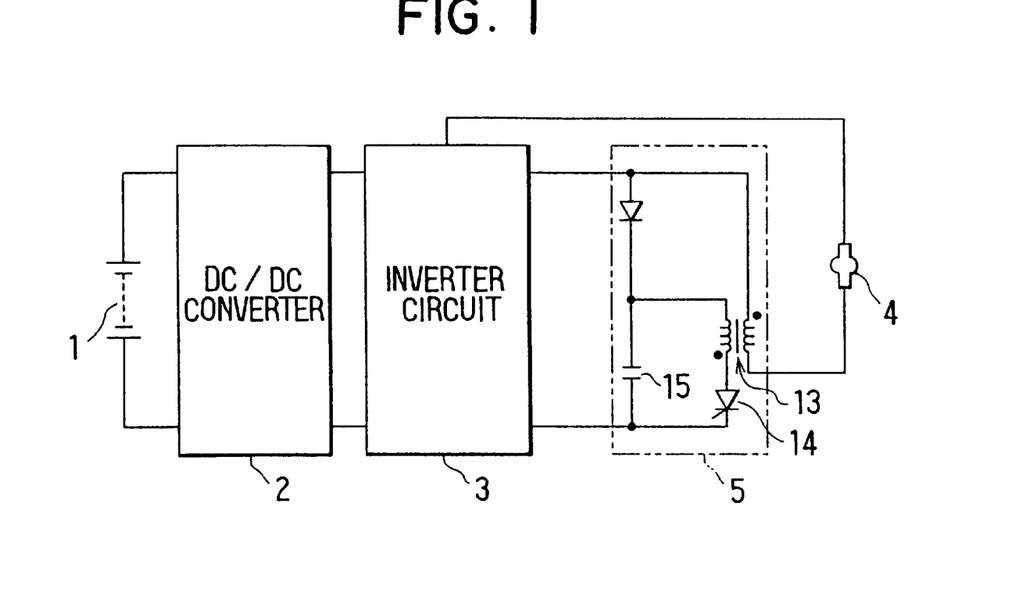
FIG. 1 is a block diagram showing an electrical construction of a discharge lamp lighting apparatus according to a first embodiment of the present invention.

Referring first to FIG. 1, a battery 1 is used as an electric power source for a discharge lamp 4 which may be mounted on a vehicle (not shown). A discharge lamp lighting apparatus (ballast) is constructed to boost a direct current voltage of the battery 1 by a DC/DC converter 2, and to convert the boosted voltage into an alternating current voltage by an inverter circuit 3 for lighting the lamp 4. Further, the ballast is constructed to generate a high voltage by a starter transformer 13 of a starter circuit 5 at the time of starting to light the lamp 4 to cause a capacitive discharge between the electrodes of the lamp 4 and generate an arc. The starter circuit 5 also includes a thyristor 14, a capacitor 15 and the like. Each of the circuits 2–5 is controlled by a lighting control circuit (not shown).

Figure 2:
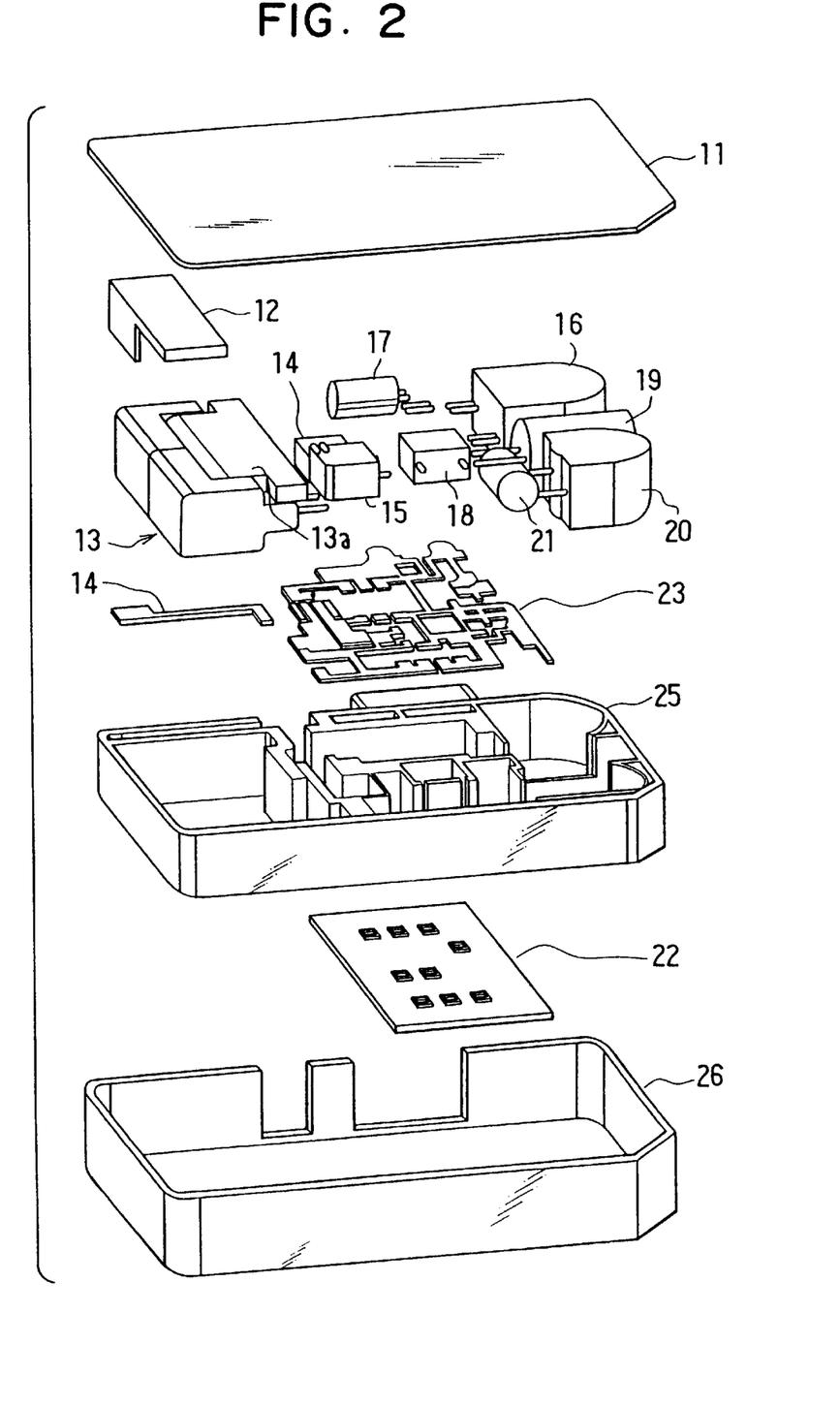
FIG. 2 is an exploded perspective view showing components of the discharge lamp lighting apparatus used in the first embodiment.

As shown in FIG. 2, the ballast includes a ballast cover 11, a resin cover 12, the starter circuit 5 comprising the starter transformer 13, the thyristor 14 and the capacitor, and the DC/DC converter 2 comprising a transformer 16, capacitors 17–19 and an inductor 20. The ballast further includes a take-over capacitor 21 for quickly changing the discharge between the electrodes of the lamp 4 from the dielectric breakdown to the arc discharge, a hybrid integrated circuit (HIC) 22 in which circuit components other than the above circuit components 13–25 are integrally circuited. The HIC 22 may include electronic circuit components of the DC/DC converter 2, the inverter circuit 3 and other electronic circuits such as the control circuit.

The ballast further includes a bus bar 23 as a wiring member for electrically connecting each circuit component 13–25 and the HIC 22, a connecting terminal 24 connected to the starter transformer 13, a bus bar casing 25 made of an electrically insulating resin as a mounting member, and a base 26 made of a metal as a metal casing.

The starter transformer 13 is constructed in such a manner that its winding is electrically insulated by molding with an epoxy resin or the like after being accommodated within a transformer casing 13a. The bus bar 23 and the connecting terminal 24 are insert-molded integrally with the bus bar casing 25.

The above ballast is assembled in the following process.

Figure 3:
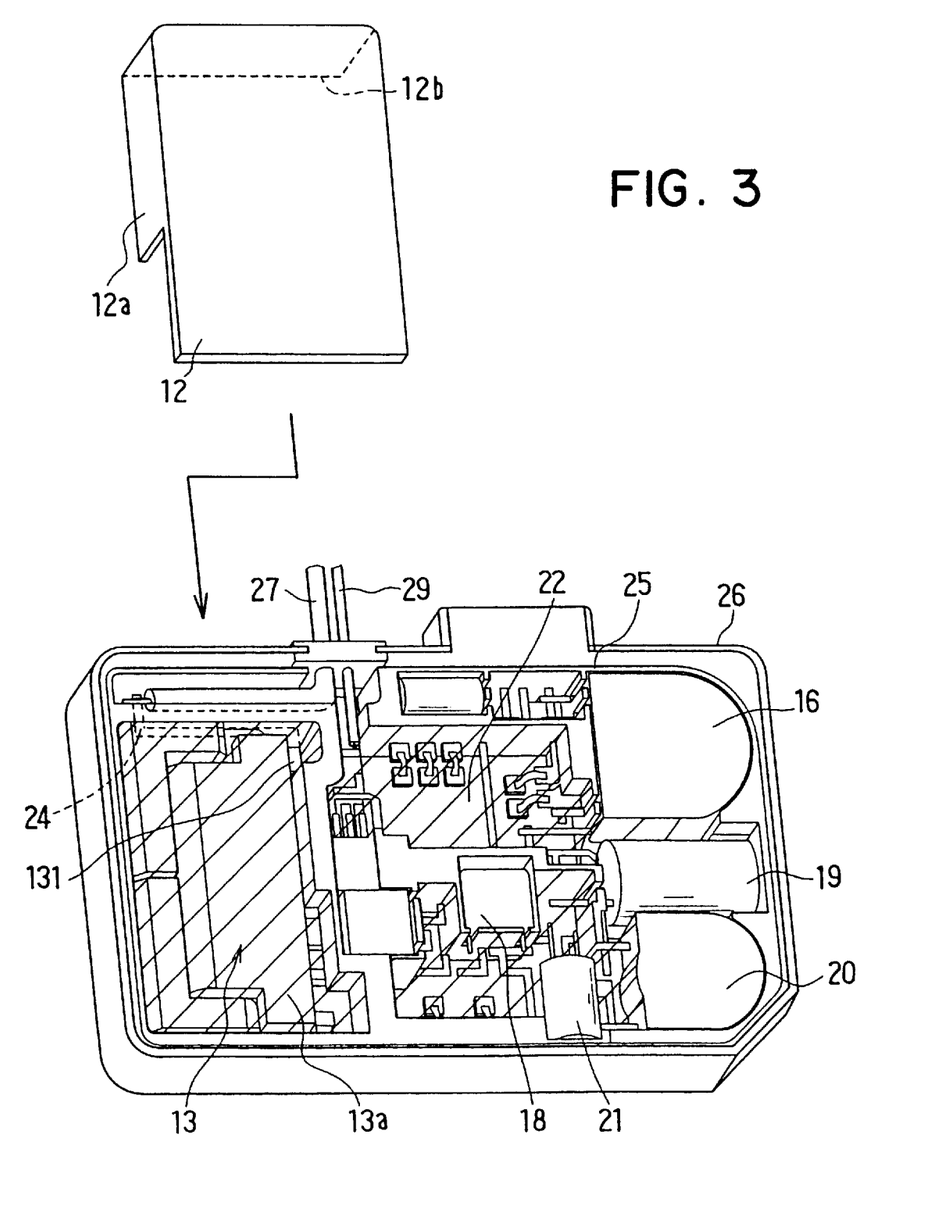
FIG. 3 is an exploded perspective view showing the components of the discharge lamp lighting apparatus in an assembled condition in the first embodiment.

First, each circuit component 13–21 is connected by welding, soldering or the like to the bus bar 23 which is insert-molded with the bus bar casing 25. Similarly to the bus bar 23, as shown in FIG. 3, a high voltage terminal 131 of the starter transformer 13 is connected by welding, soldering or the like to one end of the connecting terminal (bus bar insert terminal) 24 insert-molded with the bus bar casing 25. The bus bar casing 25 is cemented to the base 26 on which the HIC 22 is attached, and each terminal of the HIC 22 is connected to the bus bar 23 by wire-bonding.

After this process, the bus bar casing 25 is filled with a sealing resin (e.g., silicone gel) to seal the starter transformer 13 and the HIC 22 with the silicone gel. The part which is sealed by the silicone gel is shown by hatched lines in FIG. 3. Although the connection part between the high voltage terminal 131 of the starter transformer 13 and the connecting terminal 24 is sealed with the silicone gel, the other part of the connecting terminal 24 is exposed without filling of the silicone gel.

Figure 4:
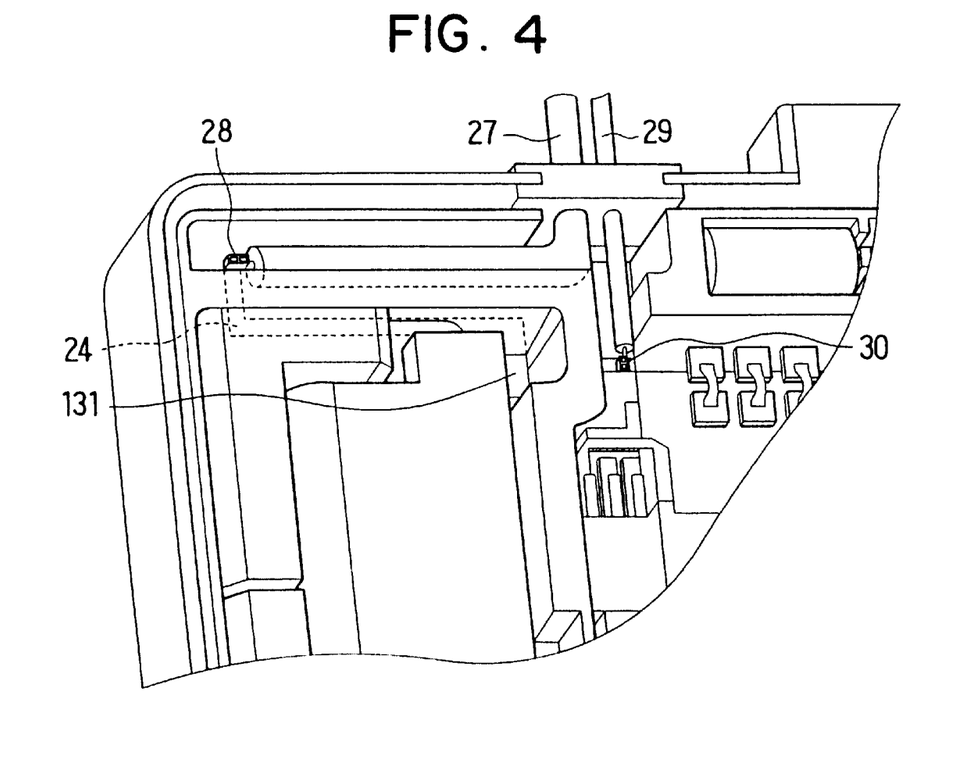
FIG. 4 is an enlarged view showing a modification of a connection between an output cable and a starter transformer used in the first embodiment.

The other end of the connecting terminal 24 and the high voltage side terminal of the output cable 27 are connected after the silicone gel solidifies. In this instance, the connection may be made either by welding, soldering or the like, or through an electrical connector part 28 as shown in FIG. 4. That is, the other end of the connecting terminal 24 is bent into an L-shape to have an upwardly protruding part, and the free end of the output cable 27 is shaped to be fitted to the protruding part. The protruding part of the connecting terminal 24 is inserted and fitted into the free end of the output cable 27, thus providing the connector part 28. A low voltage terminal side of another output cable 29 may similarly be connected to the starter transformer 13 through a connector part 30. With this type of connector connection, the output cables 27 and 29 can be connected with ease.

Figure 5:
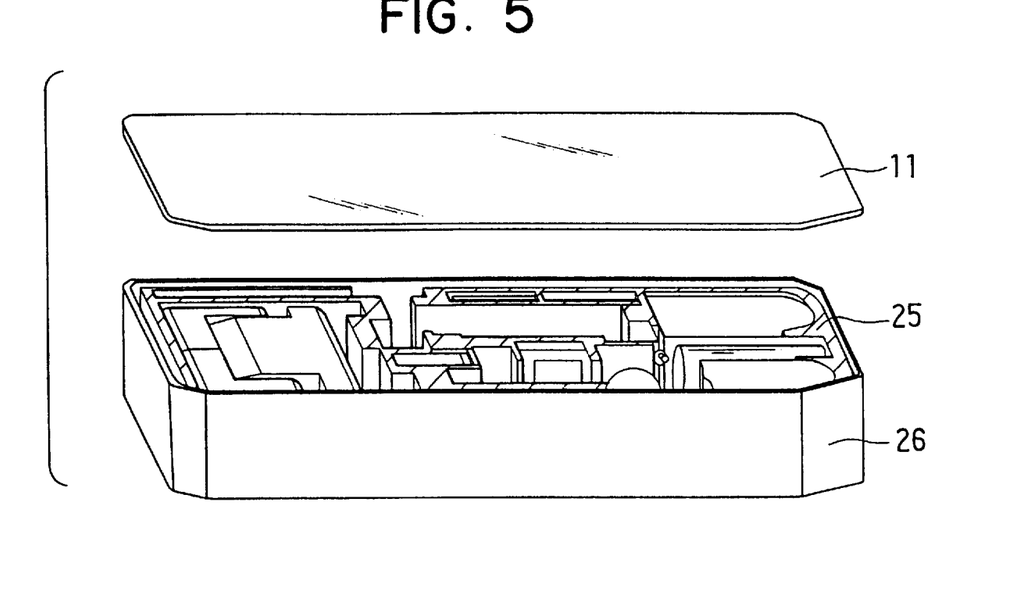
FIG. 5 is a perspective view showing a ballast cover and a base in the first embodiment.

Because a part of the connecting terminal 24 which is subjected to the high voltage is exposed, the exposed part needs to be electrically insulated. For this reason, protrusions 12a and 12b of the resin cover 12 are inserted between the bus bar casing 25 and the base 26 in assembling the resin cover 12. Thus, because the protrusions 12a and 12b of the resin cover 12 are interposed between the exposed part of the connecting terminal 24 and the base 26, the surface-to-surface distance (voltage resisting distance) between the exposed part of the connecting terminal 24 and the base 26 is lengthened to ensure the electrical insulation of the exposed part of the connecting terminal 24. The resin cover 12 thus functions as a member for ensuring the surface-to-surface distance. Finally, as shown in FIG. 5, the cover 11 is assembled to the base 26 by a fixing member such as threads (not shown).

According to the first embodiment, because the starter transformer 13 is constructed in such a manner that its winding is electrically insulated by molding with the epoxy resin or the like after being accommodated within the transformer casing 13a, the winding and the output cable 27 are not connected within the transformer casing 13a. As a result, the manufacturing process of the starter transformer 13 is simplified and the production cost is reduced.

Further, because the process of connecting the output cable 27 is performed after the process of sealing with the silicone gel, the output cable 27 is not yet connected in the process of electrically connecting each circuit component 13–25 and the HIC 22 to the bus bar 23 and in the process of filling with silicone gel. As a result, the assembling process can be automated.

The ballast cover 11 is desired to be as thin as possible because the ballast is more preferred to be thin. However, because the rigidity of the ballast cover 11 lowers in this instance, stress is exerted on the inside circuit components such as the circuit components 13–25 and 22 thus causing defects when the ballast cover 11 deforms due to an external force. To counter this problem, the upper surface (shown with hatched lines in FIG. 5) of the bus bar casing 25 is elevated higher than the inside circuit components. Thus, the ballast cover 11 is prevented from deforming and from exerting the stress to the inside circuit components.

Further, the starter transformer 13 and the transformer 16 are located at both end sides in the bus bar casing 25 and the HIC 22 is located centrally, because the starter transformer 13 and the transformer 16 of the DC/DC converter 2 are components which generate magnetic noises in operation. As a result, erroneous operation of the HIC 22 arising from the magnetic noises is prevented.

(Second Embodiment)

Figure 6:
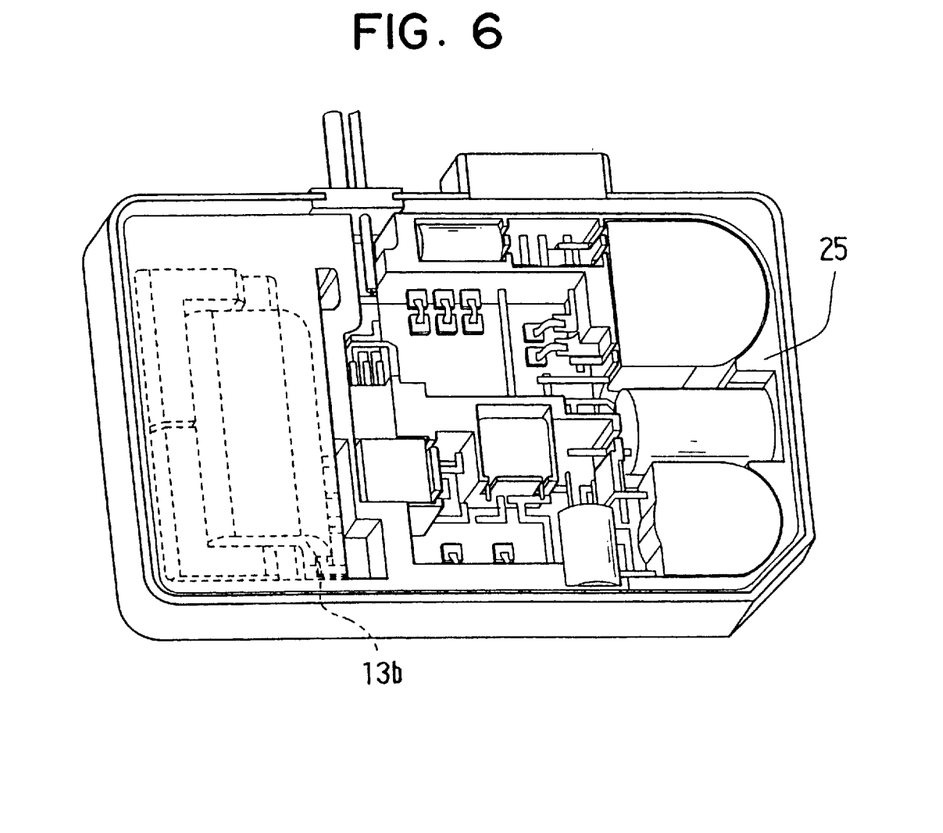
FIG. 6 is a perspective view showing a discharge lamp lighting apparatus according to a second embodiment of the present invention.

In this embodiment, as shown in FIG. 6, the transformer 13 is constructed without having the transformer casing 13a used in the first embodiment. That is, after the high voltage terminal 131 of the starter transformer 13 and the connecting terminal 24 are electrically connected, the winding 13b of the starter transformer 13, the bus bar 23 and the connecting terminal 24 are insert-molded with a resin for the bus bar casing 25.

Then, similarly to the first embodiment, after the circuit components 13–25 and the HIC 22 are connected to the bus bar 23 and the bus bar casing 25 is fixed to the base 26, the inside space of the bus bar casing 25 is filled with the silicone gel. After the output cables 27 and 29 are connected subsequently, the resin cover 12 and the ballast cover 11 are assembled.

According to this embodiment, the transformer 13 is assembled into the bus bar casing 25 with its winding 13b being in the exposed condition. As a result, the process of filling the transformer casing with the silicone gel can be eliminated. Further, the starter transformer 13 has a simple construction in which the winding 13b is exposed. As a result, the transformer casing need not be used thus cutting cost down, and the starter transformer 13 can be sized small.

(Third Embodiment)

Figure 7:
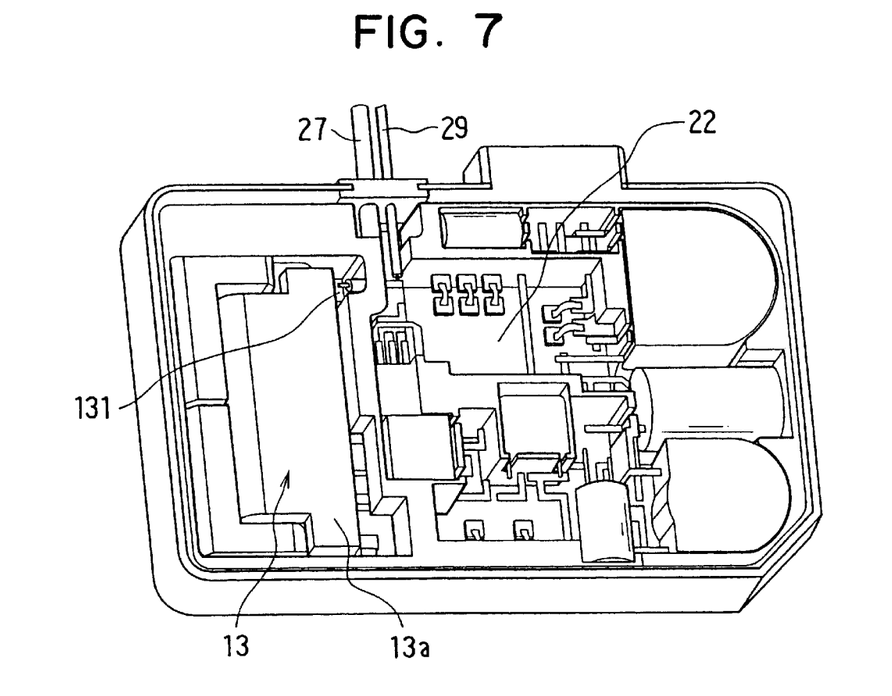
FIG. 7 is a perspective view showing a discharge lamp lighting apparatus according to a third embodiment of the present invention.

In this embodiment, as shown in FIG. 7, the connecting terminal 24 used in the first and second embodiments is not used. That is, similarly to the first embodiment, the starter transformer 13 is molded with the epoxy resin or the like to electrically insulate its winding after accommodating the winding within the transformer casing 13a. The high voltage terminal 131 and the terminal end of the output cable 27 are connected by welding, soldering or the like. Then, the HIC 22 is sealed with the silicone gel to be water-proof. At the same time, the silicone gel fills around the high voltage terminal 131 of the starter transformer 13 for insulation from the high voltage of the starter transformer 13.

Accordingly, in this embodiment, because the starter transformer 13 is molded with the epoxy resin or the like to electrically insulate its winding after accommodating the winding within the transformer casing 13a, the winding and the output cable 27 are not connected within the transformer casing 13a. As a result, the manufacturing process of the starter transformer 13 can be simplified, and the manufacturing cost can be reduced. Further, because the silicone gel fills around the HIC 22 and the high voltage terminal of the starter transformer 13 at the same time, the electrical insulation of the high voltage terminal of the starter transformer 13 can be attained in low manufacturing costs.

(Fourth Embodiment)

Figure 8:
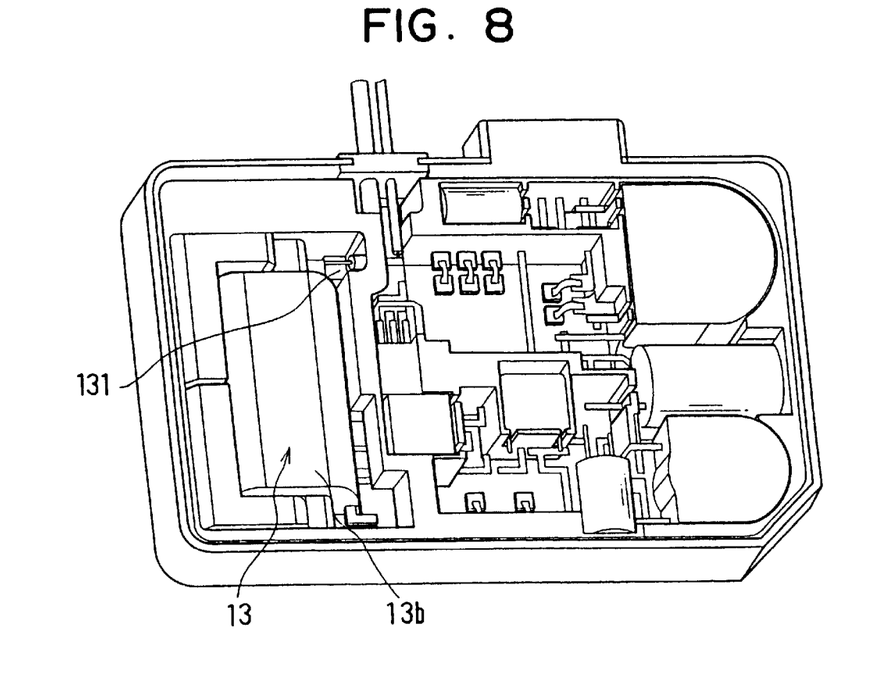
FIG. 8 is a perspective view showing a discharge lamp lighting apparatus according to a fourth embodiment of the present invention.

In this embodiment, as shown in FIG. 8, the starter transformer 13 is constructed without the transformer casing 13a. That is, the high voltage terminal 131 and the terminal end of the output cable 27 are connected by welding, soldering or the like under the condition that the winding 13b of the starter transformer 13 is exposed. Then, the silicone gel fills around the HIC 22 to be water-proof. At the same time, the silicone gel fills around the high voltage terminal 131 of the starter transformer 13 and the winding 13b as well for insulation from the high voltage of the starter transformer 13.

Thus, the starter transformer 13 can be constructed simply with its winding 13b being exposed, the process of potting epoxy resin exclusively on a single body of the starter transformer 13 can be eliminated and the cost can be reduced by eliminating the transformer casing or the like. Further, the starter transformer 13 can be sized small.

Although the silicone gel is used as a sealing resin in the above various embodiments, silicone resin, urethane resin, epoxy resin or the like may be used alternatively as long as such a resin is capable of ensuring water-proofness, electrical insulation or the like. Further, although the bus bar casing 25 is used as a mounting member for mounting the circuit components, a printed circuit substrate wiring may be used alternatively.

(Sixth Embodiment)

Figure 9:
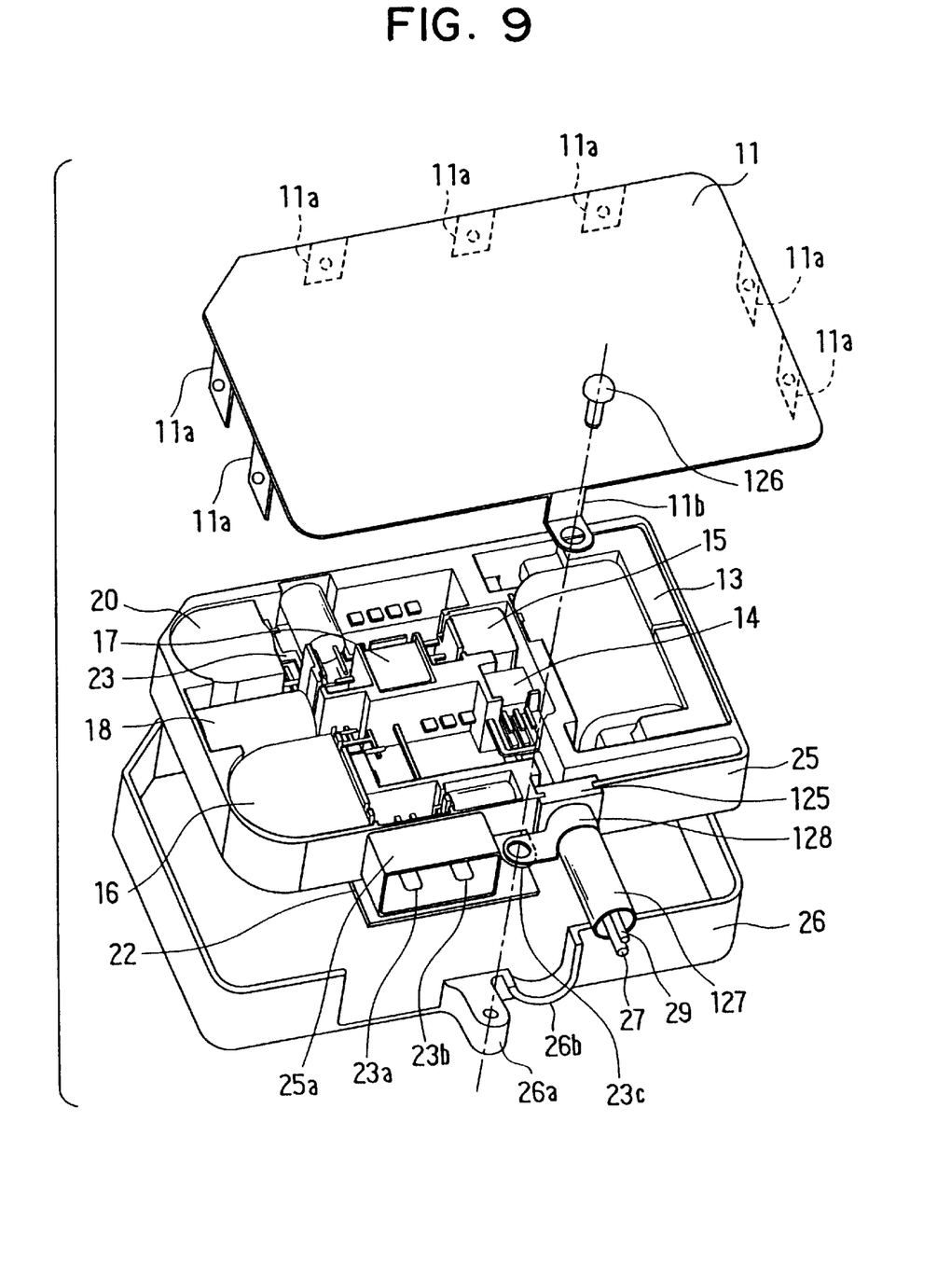
FIG. 9 is a perspective view showing a discharge lamp lighting apparatus according to a fifth embodiment of the present invention.

In this embodiment, as shown in FIG. 9, the ballast cover (metal cover member) 11 is in a flat plate shape having a plurality of protrusions 11a and a thread holder 11b on its outer periphery. It is manufactured by pressing aluminum. The base (metal base member) 26 is a box-like shape which opens at its upper part. However, it has a thread stopper 26a formed with a female thread and protruding toward an outside opposite to the inside space for accommodating the bus bar casing 25. It also has an opening 26b for enabling a cylindrical metal shielding sheath 127 to extend therethrough. The sheath 127 covers the output cables 27 and 29 which connect the starter transformer 13 to the lamp 4 (FIG. 1).

Figure 10:
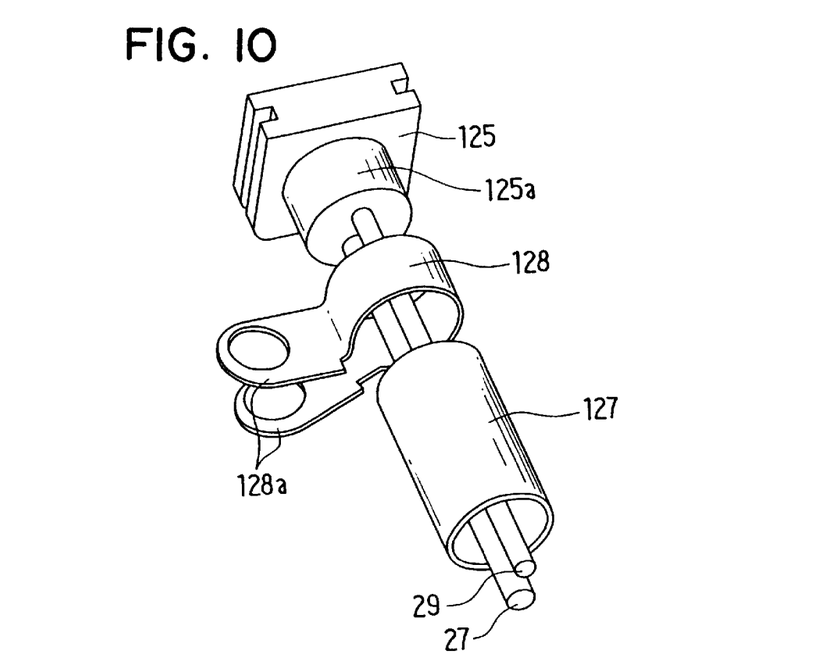
FIG. 10 is an enlarged perspective view showing components used to assemble an output cable of the discharge lamp control apparatus in the fifth embodiment.

Further, in this embodiment, the shielding sheath 127 is fixed to the bus bar casing 25 by a clip (fixing member) 128. That is, as shown in FIG. 10, the free end part of the shielding sheath 127 is fitted on a cylindrical protrusion 125a of the grommet 125 attached to the bus bar casing 25 and then the free end part is fixed to the grommet 125 by the clip 128.

Figure 11:
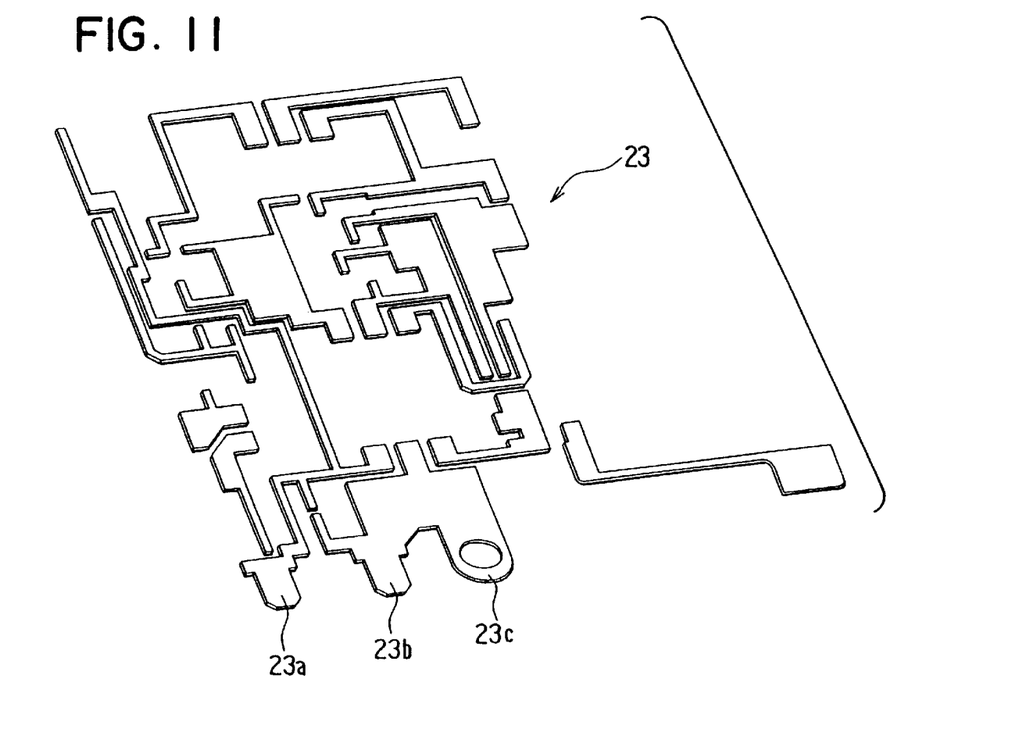
FIG. 11 is a perspective view showing a bus bar of the discharge lamp lighting apparatus used in the fifth embodiment.

Further, the bus bar (wiring member) 23 electrically connected to the various circuit components 13–22 for controlling the lighting of the lamp 4 is shaped as shown in FIG. 11. It has a terminal part 23a for connection with the positive side of the battery 1, a terminal part 23b for connection with the negative side, i.e, the ground side, of the battery 1, and a ground connection part 23c which is integral with the terminal part 23b. As shown in FIG. 9, the terminal parts 23a and 23b are constructed to protrude within a connector part 25a, and the ground connection part 23c is constructed to protrude outwardly from the bus bar casing 25 to be thread-fixed by a thread 126.

The ballast as constructed above is assembled as follows.

First, each circuit component 13–21 and the like are connected by welding, soldering or the like to the bus bar 23 which is insert-molded with the bus bar casing 25. The bus bar casing 25 is cemented to the base 26 on which the HIC 22 is attached, and each terminal of the HIC 22 is connected to the bus bar 23 by wire bonding. The output cables 27 and 29 are connected to the bus bar 23 by welding, soldering or the like, and the output cables 27 and 29 are fixed to the bus bar casing 25 by the grommet 125.

The shielding sheath 127 is fixed to the grommet 125 by the clip 128, and then the cover 11 is mounted from the upper side of the base 26 to be assembled. In this assembling, the plurality of protrusions 11a of the cover 11 are inserted between the base 26 and the bus bar casing 25 and holes formed in the protrusions 11a are fitted around protrusions, not shown, of the bus bar casing 25.

Figure 12:
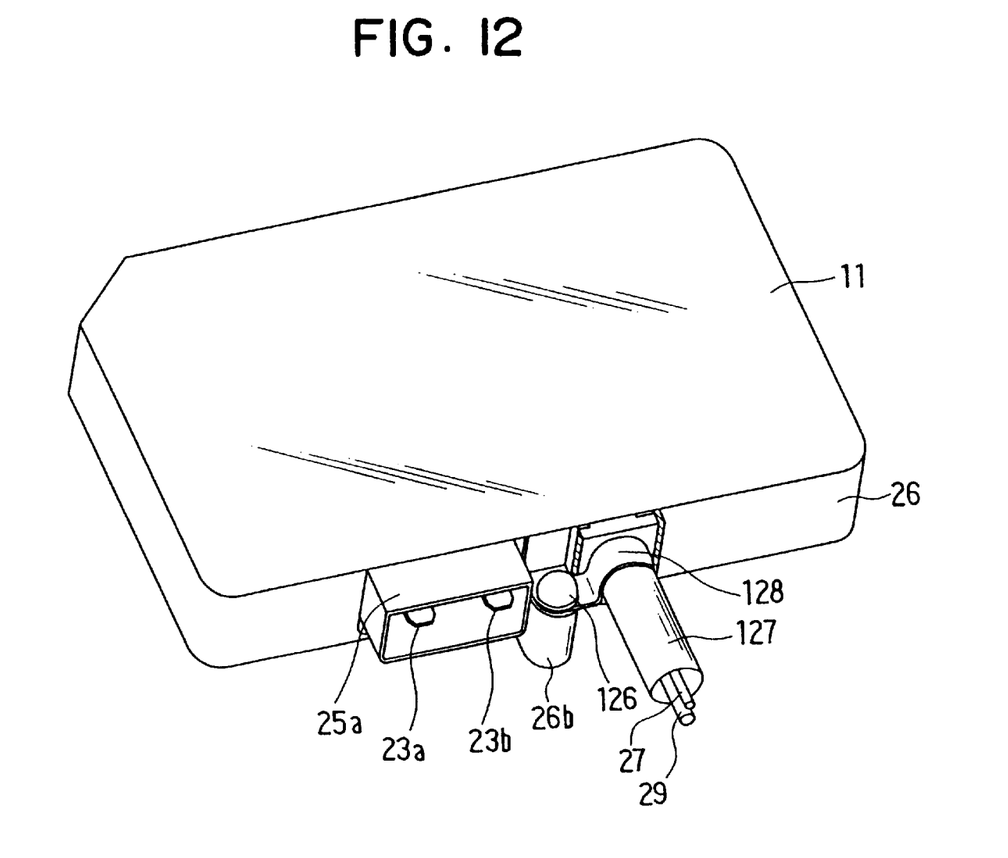
FIG. 12 is a perspective view showing an outside configuration of the discharge lamp lighting apparatus in the fifth embodiment.

Then, the thread holder 11b of the cover 11, the thread fixing piece 128a of the clip 128, the ground connection part 23c of the bus bar and the thread stopper 26a of the base 26 are thread-engaged by the thread 126. Thus, an assembly of the ballast is completed as shown in FIG. 12.

In the above ballast, the cover 11, the clip 128, the ground connection part 23c of the bus bar and the base 26 are electrically connected by the above thread engagement and grounded. Accordingly, the cover 11 and the base 26 are grounded through the ground connection part 23c of the bus bar, and the shield sheath 127 is grounded through the clip 128 and the ground connection part 23c of the bus bar 23.

According to this embodiment, the assembly of the ballast can be simplified and the cost can be reduced, because the cover 11, the base 26, the ground connection part 23c of the bus bar 23 and the shielding sheath 127 are connected to the ground at one location. Further, the cover 11 need not have a sheath connection part by fixing the shielding sheath 127 to the bus bar casing 25 in advance. As a result, it can be manufactured by pressing a metal to reduce the manufacturing cost.

Although the bus bar casing 25 is used as a mounting member for mounting the circuit components, a printed circuit substrate may be used.

The above embodiments may further be modified or altered in implementing the present invention.

What is claimed is:

1. A discharge lamp lighting apparatus comprising:

circuit components including a starter transformer;

a mounting member for mounting the circuit components; and a connecting terminal having one end electrically connected to a high voltage terminal of the starter transformer and the other end electrically connected to an output cable, wherein a connection part between the high voltage terminal of the starter transformer and the one end of the connecting terminal is sealed in an electrically insulated manner with a sealing resin.

2. A discharge lamp lighting apparatus as set forth in claim 1, wherein:

the connection part and the circuit components other than the starter transformer are sealed in the electrically insulated manner with the sealing resin.

3. A discharge lamp lighting apparatus as set forth in claim 1, wherein the other end of the connecting terminal and the output cable are connected through an electrical connector part.

4. A discharge lamp lighting apparatus comprising:
circuit components including a starter transformer;
a mounting member for mounting the circuit components; and
a connecting terminal having one end electrically connected to a high voltage terminal of the starter transformer and the other end electrically connected to an output cable,
wherein the starter transformer is assembled within the mounting member with its winding being exposed.

5. A discharge lamp lighting apparatus as set forth in claim 4, wherein:
the connecting terminal is constructed integrally with the mounting member.

6. A discharge lamp lighting apparatus as set forth in claim 4, further comprising:
a metal casing for accommodating the mounting member therein; and
a member provided between the connecting terminal and the metal casing to ensure a surface-to-surface distance therebetween.

7. A discharge lamp lighting apparatus as set forth in claim 4, wherein:
the other end of the connecting terminal and the output cable are connected through an electrical connector part.

8. A discharge lamp lighting apparatus comprising:
circuit components including a starter transformer;
a mounting member for mounting the circuit components; and
an output cable electrically connected to a high voltage terminal of the starter transformer,
wherein a connection part between the high voltage terminal of the starter transformer and the output cable and the circuit components other than the starter transformer are sealed in an electrically insulated manner with a sealing resin.

9. A discharge lamp lighting apparatus as set forth in claim 8, wherein:
the starter transformer is mounted on the mounting member with its winding being exposed; and
the winding is sealed in the electrically insulated manner with the insulating resin.

10. A discharge lamp lighting apparatus as set forth in claim 8, wherein the connection part is connected to the output cable through an electrical connector part.

11. A manufacturing method for a discharge lamp lighting apparatus comprising:
mounting circuit components including a starter transformer on a mounting member; and
sealing a connection part between a high voltage terminal of the starter transformer and an output cable and the circuit components other than the transformer in an electrically insulated manner with a sealing resin.

12. A manufacturing method for a discharge lamp lighting apparatus as set forth in claim 11, wherein:
the mounting member includes a connecting terminal which connects the high voltage terminal of the starter transformer and the output cable;
connecting the high voltage terminal of the starter transformer to one end of the connecting terminal and sealing a connection part therebetween in the electrically insulated manner with the insulating resin; and
the output cable is subsequently connected to the other end of the connecting terminal.

13. A manufacturing method for a discharge lamp lighting apparatus as set forth in claim 11, wherein:
the output cable is connected to the high voltage terminal of the starter transformer after mounting the circuit components including the starter transformer; and
the high voltage terminal and the output cable are subsequently sealed in the electrically insulated manner with the insulating resin.

14. A manufacturing method for a discharge lamp lighting apparatus as set forth in claim 13, wherein:
the starter transformer is assembled on the mounting member with its winding being exposed; and
the winding is sealed in the electrically insulated manner with the sealing resin.

15. A manufacturing method for a discharge lamp lighting apparatus as set forth in claim 11, wherein the connection part is connected to the output cable through an electrical conductor part.

16. A manufacturing method for a discharge lamp lighting apparatus comprising:
providing a mounting member having a connecting terminal;
assembling a starter transformer on the mounting member by connecting a high voltage terminal of the starter transformer to one end of the connecting terminal;
assembling circuit components other than the starter transformer on the mounting member;
sealing a connection part between the high voltage terminal of the starter transformer and the one end of the connecting terminal in an electrically insulated manner with an insulating resin; and
connecting an output cable to the other end of the terminal;
wherein a bus bar casing is used as the mounting member in which the connecting terminal and a bus bar are insert-molded; and
the circuit components including the starter transformer are assembled within the bus bar casing.

17. A manufacturing method for a discharge lamp lighting apparatus comprising:
connecting a high voltage terminal of a starter transformer to one end of a connecting terminal with its winding being exposed;
insert-molding the high voltage terminal and the connecting terminal with a bus bar to provide a bus bar casing;
assembling the circuit components other than the starter transformer within the bus bar casing; and
connecting an output cable to the other end of the connecting terminal.

18. A manufacturing method for a discharge lamp lighting apparatus as set forth in claim 17, wherein:
the bus bar casing is fixed within a metal casing; and
a member is provided between the connecting terminal and the metal casing to ensure a surface-to-surface distance therebetween.

19. A manufacturing method for a discharge lamp lighting apparatus as set forth in claim 17, wherein:
the other end of the connecting terminal and the output cable are connected through an electrical connector part.

20. A manufacturing method for a discharge lamp lighting apparatus which includes a starter transformer for activating a discharge lamp at the time of starting to light the discharge lamp, an output cable connectable to the discharge lamp, a bus bar casing for accommodating the starter transformer, the output cable and a bus bar connecting the starter transformer and the output cable, and a connecting terminal for connecting the starter transformer, the method comprising:

electrically connecting the starter transformer and the connecting terminal after accommodating the starter transformer in the bus bar casing;

filling the starter transformer with a resin;

placing the output cable in the bus bar casing; and electrically connecting the output cable and the connecting terminal.

21. A manufacturing method for a discharge lamp lighting apparatus as set forth in claim 20, wherein:

the starter transformer and another transformer are placed at opposite end sides in the bus bar casing.

22. A manufacturing method for a discharge lamp lighting apparatus as set forth in claim 20, wherein:

the bus bar casing has its wall height greater than a height of electrical circuit components mounted on the bus bar.

23. A discharge lamp lighting apparatus comprising:

a circuit unit having a bus bar connectable to an electric power source and circuit components connected to the bus bar for controlling lighting of a high voltage discharge lamp;

an output cable for connecting the circuit unit and the high voltage discharge lamp;

a shielding member covering the output cable; and a base accommodating the circuit unit therein, wherein a ground connection part of the bus bar which is connectable to a ground side of the electric power source, the shielding member and the base are constructed to be grounded at one location under a condition that the circuit unit is accommodated within the base.

24. A discharge lamp lighting apparatus as set forth in claim 23, wherein:

the circuit unit has a casing member for mounting the circuit components therein;

the shielding member is fixed to the casing member through a fixing member; and the shielding member is grounded through the fixing member.

25. A discharge lamp lighting apparatus comprising:

a circuit unit having a bus bar member connectable to an electric power source and circuit components connected to the bus bar member for controlling lighting of a high voltage discharge lamp;

an output cable for connecting the circuit unit and the high voltage discharge lamp;

a shielding member covering the output cable; and a metal base member and a metal cover member for accommodating the circuit components, wherein the circuit unit has a casing member for mounting the circuit components therein and the shielding member is fixed to the casing member through a fixing member, and wherein the cover member, a ground connection part of the bus bar member which is connectable to a ground side of the electric power source, the fixing member and the base member are constructed to be grounded through a thread engagement under a condition that the circuit unit and the cover member are assembled to the base member.

26. A discharge lamp lighting apparatus as set forth in claim 25, wherein:

the base member has a thread stopper part protruding outwardly; and the ground connection part, the fixing member and the cover member are constructed to be stopped at the thread stopper part when the circuit unit and the cover member are assembled to the base member.

27. A discharge lamp lighting apparatus comprising:

a circuit unit having a bus bar member connectable to an electric power source and circuit components connected to the bus bar member for controlling lighting of a high voltage discharge lamp;

an output cable for connecting the circuit unit and the high voltage discharge lamp;

a shielding member covering the output cable;

a metal base member having a box-like shape which is open at an upper part; and a metal cover member having a flat plate shape, wherein the circuit unit has a casing member for mounting the circuit components therein, the shielding member is fixed to the casing member through a clip, and a ground connection part of the bus bar member connectable to a ground side of the electric power source is protruded from the casing member, and wherein the cover member, the ground connection part, the clip and the base member are constructed to be grounded by a thread engagement under a condition that the cover member is mounted in an open part of the base member.

\* \* \* \* \*